United States Patent [19]
Hajek et al.

[11] 3,968,436
[45] July 6, 1976

[54] APPARATUS FOR TESTING THE OPERABILITY OF EMERGENCY VEHICULAR RADIO TRANSMITTERS

[75] Inventors: Frantisek Hajek; Miroslav Studnicka; Jaroslav Kavalir, all of Prague, Czechoslovakia

[73] Assignee: Tesla, Prague, Czechoslovakia

[22] Filed: Dec. 4, 1974

[21] Appl. No.: 529,399

[30] Foreign Application Priority Data
Dec. 5, 1973  Czechoslovakia .................. 8371-73

[52] U.S. Cl. ................................. 325/67; 325/133; 325/363
[51] Int. Cl.² ......................................... H04B 17/00
[58] Field of Search .................... 325/31, 51, 53, 55, 325/64, 65, 66, 67, 117, 133, 312, 313, 363, 364; 340/38 R, 22, 31 R, 32, 33, 224, 248 R; 174/35 R, 50; 324/76 R, 77 B, 77 E

[56] References Cited
UNITED STATES PATENTS

| | | |
|---|---|---|
| 2,913,577 | 11/1959 | Johnson .............................. 325/363 |
| 2,926,304 | 2/1960 | Fromm ................................ 325/363 |
| 3,441,858 | 4/1969 | Graham .............................. 325/117 |
| 3,649,909 | 3/1972 | Ort et al. ........................... 324/77 E |
| 3,768,018 | 10/1973 | Deming.............................. 325/363 |

*Primary Examiner*—Robert L. Griffin
*Assistant Examiner*—Jin F. Ng
*Attorney, Agent, or Firm*—Murray Schaffer

[57] ABSTRACT

In an emergency call system for vehicles on public roads, in which the vehicle is provided with a radio transmitter adapted to selectively emit a signal in a plurality of modes, a testing system having a receiver for the emitter signal, and an attenuator for suppressing and blocking spurious and unwanted interfering noise connected to the input of the receiver. The output of the receiver is fed to at least one filter by which the mode of the signal is determined. The output of the filter is connected to the input of a plurality of switching circuits adapted to operate signal lamps corresponding to the transmitted signal mode.

4 Claims, 3 Drawing Figures

APPARATUS FOR TESTING THE OPERABILITY OF EMERGENCY VEHICULAR RADIO TRANSMITTERS

BACKGROUND OF THE INVENTION

The present invention relates to an emergency wireless call system for vehicles on public highways and roads, and in particular to apparatus for testing the operability of the vehicle radio transmitter.

The increased number of motor vehicles used on the public highways and roads has resulted in the increased role of electronics in various traffic control and safety systems. An example of one of such systems is disclosed in the copending application, Ser. No. 446,590, filed on Feb. 28, 1974. In this application a wireless vehicle emergency call system is described which enables medical assistance, transport of injured people, and similar road services to be provided especially in sparsely settled and remote areas. An advantage of this system lies in the fact that the time needed for the arrival of the assistance, to cope with the emergency situation, is shortened to an absolute minimum and the rescue and preservation of life is greatly increased, while damage caused by the accident is significantly minimized. The emergency assistance may be called for by any one, including those involved in the vehicular accident, passers by, or those drivers of other vehicles passing the scene of the incident, even though the passing vehicle does not stop at the scene.

The wireless vehicle emergency call system, described in the aforementioned application, includes vehicle transmitters of small size adapted to selectively emit a coded signal of a given mode indicative of the type of incident and the type of assistance required at the scene. Receivers, collecting the emitted signal, are spaced at predetermined intervals along the highway or road and are connected either by wire or by radio through a control center or a dispatching station which iniates the sending of the required assistance. To insure failsafe functioning of the entire system, it is essential that each of the components, primarily the vehicle transmitters, are in proper operative condition at all times. In a fully functioning system the number of vehicle transmitters is in theory unlimited and thus form the majority of the components of the system. However, since they are in the hands of ordinary vehicle drivers and electronically unskilled persons, they must be frequently checked for their correct operational characteristics. The testing of the vehicle transmitter must satisfy two basic requirements, in addition to other less significant requirements, namely, it must provide an appropriate indication of the coded signals or the mode of operation of the vehicle transmitter, and at the same time not interfere with the normal operation and reception of the collecting receivers of the system.

It is an object of the present invention to provide testing apparatus for vehicle transmitters satisfying at least the two major criteria set forth above.

It is a further object of the present invention to provide a testing device enabling the quick and continuous checking of the correct function of a large number of vehicle transmitters of a wireless emergency call system for vehicles on public highways and roads, without interfering with the normal emergency call system.

It is another object of the present invention to provide testing apparatus in which optical signals are produced according to the respective mode of the vehicle transmitter and thus capable of indicating the operation of the transmitter corresponding to the nature of the assistance to be called for by the emergency call system.

It is a further object of the present invention to provide test apparatus for a wireless emergency call system which is capable of blocking all interfering signals and thus conducting the test with respect only to the coded signals of the vehicle transmitter.

It is still another object of the present invention to provide testing device for emergency wireless call system which acts to dissuade the vehicle operator from attempting to check the functioning of the vehicle transmitter while driving on the highway or the road so that unintentional abuse of the wireless emergency call system is prevented.

The foregoing objects, other objects, as well as numerous advantages of the present invention will be apparent from the following disclosure of the invention.

SUMMARY OF THE INVENTION

In accordance with the present invention a wireless emergency call system for vehicles on public highways or roads having a radio transmitter adapted on actuation to selectively emit a signal on a plurality of modes, is provided with apparatus for testing its operability. The apparatus comprises a receiver for the reception of the emitted signal, an attenuator connected to the input of the receiver for suppressing spurious signals and interference, a filter connected to the output of the receiver for distinguishing the mode of the emitted signal, signal indicia indicative of each of the modes, and switch means interposed between the filter and signal indicia for operation of a selective one of the signal indicia corresponding to the signal mode emitted by the transmitter.

With the apparatus of the present invention an operator of a motor vehicle may obtain an indication of the operation of the essential transmitter by merely actuating the transmitter in each of its modes. If the transmitter functions properly an indication is obtained on the signal indicia corresponding thereto. Thus, the functioning of the transmitter in whole or in part is easily determined.

In a preferred form of the invention the testing apparatus is located in a housing sufficiently large to accomodate the motor vehicle and having an exit and entry for the motor vehicle. The housing itself is formed of a thickness and of a material which is capable of screening and blocking passage of radio waves, from the testing apparatus. This insures that the testing apparatus will be responsive and sensitive only to the vehicle transmitter.

Full details of the present invention are set forth in the following description of its preferred embodiments and are illustrated in the accompanying drawings.

DESCRIPTION OF THE INVENTION

Before turning to the description of the present invention, it is again to be recalled, that the present invention is adapted to test the operability and correct functioning of a radio transmitter in a system of the type described in the aforementioned patent application. Accordingly, it is to be recalled that in the aforementioned application, coded signals are emitted from the vehicle transmitter selectively by depressing one of several buttons provided on the transmitter. Each of the buttons is adapted to provide a radio signal of a given frequency and of given modulation, signal output, or other distinguishing mode. In the following, three modes of signal are suggestive for illustrative purposes only, each of which it can be assumed will indicate a particular form of assistance required.

Figure 1:
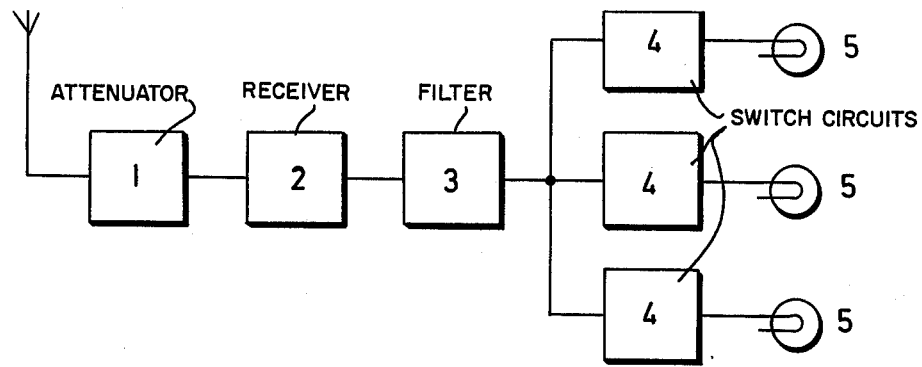
FIG. 1 is a block diagram of the circuit components of the testing apparatus embodying the present invention.

The testing apparatus according to the present invention, as seen in FIG. 1, comprises an antenna for the reception of the coded signals emanating from the vehicle transmitter. These coded signals are passed from the antenna into the input of an attenuator 1 which acts as a suppressor to suppress and block spurious radio signals and interfering noise. The attenuator may be adjustable so as to provide a more accurate reception of the emitted signal from the vehicle transmitter. From the attenuator 1, the signal is passed to the input circuits of a receiver 2 whose output is connected to a filter 3. The filter 3 differentiates the coded signals according to the nature of the assistance required (e.g., medical rescue service, normal road service, or a call for highway or local police, for instance) depending on the mode of the code. From the filter 3 the signal proceeds to one of a plurality of switching circuits 4, the output of which is connected to a corresponding signalling lamp 5. The number of switching circuits and the number of signalling lamps correspond to the several modes of the coded signal and thus the output of the filter, differentiating the coded signal according to its mode is caused to light up a relevant corresponding signalling lamp 5.

The switching circuits 4 comprise trigger circuits actuable upon the receipt of a given signal thereto which provides for a passage of actuating current to its associated signalling lamp. Simple thyristor or other similarly conventional triggering circuits may be employed.

Figure 2:
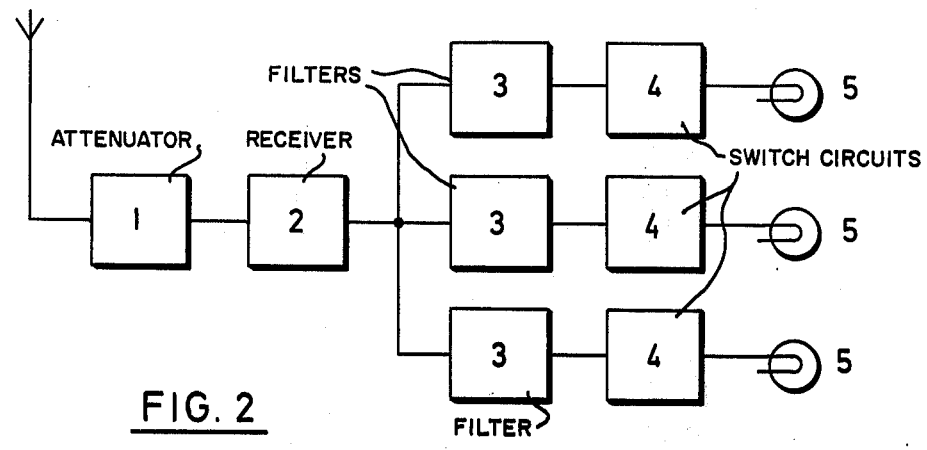
FIG. 2 is a block diagram of another embodiment of the apparatus of the present invention.

As seen in FIG. 2 the apparatus of the present invention may include a plurality of filters 3 corresponding in number to the number of the modes of the coded signal, or the number of triggering circuits and lamps 5. Each of the filters 3 may be selective band pass filters allowing passage of certain frequency input codes. Otherwise, the apparatus of FIG. 2 functions in a similar manner to that of FIG. 1.

While signalling lamps are illustrated, the means for indicating the receipt of signal in the testing apparatus can take the form of other indicia such as an oral bell, a mechanical read out device or similar conventional indicating means.

Figure 3:
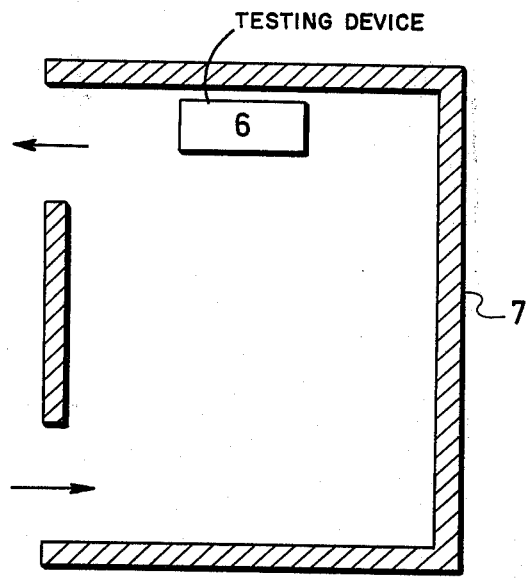
FIG. 3 is a schematic plan view of a screened space having an entry and exit for the motor vehicle in which the apparatus for the present invention is located to enable the testing of the vehicle transmitter.

As seen in FIG. 3, it is preferred that the components of the testing device, except for the signalling lamps 5 or similar indicia, are contained in a cabinet or body so as to comprise a selfcontained unit. The indicating means, lamps 5 are preferably located on the surface of the cabinet containing the components or on a signalling board or control board remote from the cabinet. The testing device is located within an area defined by a housing 7, sufficiently large to permit the vehicle to move in and out of it. The housing 7 is provided with entry and exit openings for the vehicle, indicated by the arrows in FIG. 3. The housing is preferably rectangular permitting the testing device indicated by the numeral 6 to be placed against one of the short walls and permitting the vehicle to moved into the housing so as to directly face the testing apparatus. Because the signalling lamps 5, are located on the exterior of the testing apparatus or on a remote signal board, they can be placed within the viewing field of the driver so that they are clearly visible during the test period. The walls of the housing 7 are of such thickness and are made of such material that in enclosing the area surrounded by the walls it screens the area from entry of any possibly interfering signals which might distort the test procedure. Simultaneously, the housing 7 prevents the escape from the enclosed area of an emitted signal from the vehicle to be tested so that such emitted signal, for the purposes of the test, do not escape and unintentionally trigger or be received by the conventional receiving or collecting antenna spaced along an adjacent highway or road. Thus, the housing 7 screens the testing apparatus from interfering signals rising exterior therefrom while at the same time screens the normal emergency call systems from the test signal. Any interfering test signals which may arise from the operation of the motor vehicle itself, e.g., the ignition of the motor, voice radio, or other factors, is sufficiently screened from the testing apparatus by the attenuator 1 while the vehicle is located in the housing 7.

In operation, the testing procedure for determining the correct function of the vehicle transmitter is extremely easy and quick. After the vehicle operator drives the vehicle through the entry opening into the area defined by the screening housing 7, the driver stops the vehicle in front of the testing device 6 so that the hood or bonnet of the vehicle stops short just in front of the testing device. The driver then actuates the emergency transmitter in each of its successive modes, by depressing the individual push buttons as described in the aforementioned application. Simultaneously, the driver observes the lighting of the relevant signal lamp 5 located within his field of vision. In the positive case, i.e.; the vehicle transmitter is in good working order, the signal lamp 5 will light up. On the other hand, in the negative case, i.e.; the vehicle transmitter is out of order, the relevant signal lamp 5 will fail to light up. In this latter case, the driver is visually advised that at least in part the radio transmitter must be repaired. In any event, the apparatus functions as a reliable indication of either the operability or inoperability of the apparatus by depending upon the exact signal necessary, and which has been provided for the operation of the emergency call system itself.

From the foregoing it will be quite apparent that the testing apparatus, according to the present invention, permits the inspection of a great number of vehicle transmitters easily, quickly and in a continuous and steady succession. The apparatus may be employed simultaneously with the inspection of the mechanical functioning of the vehicle and since it does not require extensive or complex apparatus to do so, it may be installed in local gas stations or at particular locations wherever convenient. The housing 7 may not be large in overall area or volume, since it size is only determined by the ability to allow motor vehicles to enter and exit therefrom. A particular advantage of the present invention lies in the fact that the operator, after passing the test, is no longer tempted to check the functioning of the vehicles transmitter on the highway by making an unjustified emergency call. As a result, the number of abuses of the vehicle emergency call system can be thus considerably decreased.

It will be obvious, to those skilled in the art, that various changes and modifications can be made in the details of the preferred embodiments of the present invention. It is accordingly intended that the particular embodiment described herein shall be taken as illustrative of the present invention and not limiting of its scope in any manner.

What is claimed:

1. In a wireless emergency call system for vehicles on public highways having a radio transmitter adapted on actuation to emit a signal in a selected one of plurality of modes, apparatus for testing the operability of said transmitter in each mode selected, comprising an antenna for the reception of the emitted signal, an adjustable attenuator connected to the output of said antenna for suppressing spurious signals and interference, a receiver connected to the output of said attenuator for receiving said emitted signal, a filter connected to the output of said receiver for distinguishing the mode of said emitted signal, signal indicia indicative of each said modes, and switch means interposed between said filter and said signal indicia for operation of selected one of said signal indicia corresponding to the signal mode emitted by said transmitter, said apparatus being located in an enlarged housing having an entry and exit for said vehicle including means for screening the exit of the emitted signal of the vehicle transmitter from said housing and means for screening the entry of signals from without said housing.

2. The apparatus according to claim 1 wherein said filter comprises a plurality of band pass filters, each adapted to pass a signal corresponding to one of said selected modes.

3. The apparatus according to claim 1 wherein said switch means comprises triggering circuits activated upon receipt of a given signal from said filter.

4. The apparatus according to claim 1 wherein said signal indicia are lamps.

* * * * *